United States Patent [19]

Moulton et al.

[11] Patent Number: 5,632,925
[45] Date of Patent: May 27, 1997

[54] CERAMIC OR MODIFIED SILICONE FILLED MOLDING TOOLS FOR HIGH TEMPERATURE PROCESSING

[75] Inventors: Richard Moulton, Benicia; Doyle Dixon, Vallejo; Robert L. Stevens; Gregg Siewert, both of San Diego, all of Calif.; Gary D. MacDougall, Auckland, New Zealand

[73] Assignee: Logic Tools L.L.C., Durham, N.C.

[21] Appl. No.: 370,686

[22] Filed: Jan. 10, 1995

[51] Int. Cl.⁶ .................................................. B29C 33/38
[52] U.S. Cl. ........................... 249/115; 249/134; 264/225; 264/258; 264/337; 156/89
[58] Field of Search ............................... 249/134, 114.1, 249/115; 264/62, 225, 337, 258, 311; 425/435

[56] References Cited

U.S. PATENT DOCUMENTS

| | | | |
|---|---|---|---|
| 2,977,265 | 3/1961 | Forsberg et al. | 428/116 |
| 3,575,789 | 4/1971 | Siefert et al. | 65/42 |
| 3,691,266 | 9/1972 | Greenberg | 264/86 |
| 3,801,255 | 4/1974 | Meyer et al. | 425/147 |
| 3,824,112 | 7/1974 | Lawrence et al. | 106/38.3 |
| 4,259,279 | 3/1981 | Greenberg | 264/86 |
| 4,404,129 | 9/1983 | Penberthy et al. | 252/629 |
| 4,519,765 | 5/1985 | Abrams | 425/263 |
| 4,524,817 | 6/1985 | Brugger et al. | 164/290 |
| 4,614,630 | 9/1986 | Pluim, Jr. | 249/134 |
| 4,615,935 | 10/1986 | Bendig et al. | 428/268 |
| 4,689,262 | 8/1987 | Bloom | 428/201 |
| 4,740,246 | 4/1988 | Feagin | 106/38.22 |
| 4,828,774 | 5/1989 | Andersson et al. | 264/60 |
| 4,834,929 | 5/1989 | Dehoff et al. | 249/134 |
| 4,836,963 | 6/1989 | Gilman, Jr. | 264/45.7 |
| 4,915,760 | 4/1990 | Singh et al. | 264/60 |
| 4,925,611 | 5/1990 | Shockney et al. | 249/134 |
| 4,938,802 | 7/1990 | Noll et al. | 106/38.9 |
| 4,954,062 | 9/1990 | Willing | 425/135 |
| 4,990,292 | 2/1991 | Hattori et al. | 264/337 |
| 5,024,979 | 6/1991 | Debaig-Valade et al. | 264/62 |
| 5,039,297 | 8/1991 | Masters | 425/429 |
| 5,057,155 | 10/1991 | Nakayama et al. | 106/35 |
| 5,071,338 | 12/1991 | Dubliniski et al. | 249/134 |
| 5,078,818 | 1/1992 | Han et al. | 156/89 |
| 5,092,948 | 3/1992 | Lange et al. | 156/89 |
| 5,094,607 | 3/1992 | Masters | 425/429 |
| 5,149,474 | 9/1992 | Rohatyn | 249/134 |
| 5,160,676 | 11/1992 | Singh et al. | 264/60 |
| 5,208,192 | 5/1993 | Yu et al. | 264/62 |
| 5,223,064 | 6/1993 | Gadkaree | 156/89 |
| 5,250,243 | 10/1993 | Allaire et al. | 264/63 |
| 5,298,204 | 3/1994 | O'Connor et al. | 264/60 |
| 5,350,545 | 9/1994 | Streckert et al. | 264/62 |
| 5,486,251 | 1/1996 | Leung | 264/62 |

FOREIGN PATENT DOCUMENTS

| | | | |
|---|---|---|---|
| 11738 | 6/1980 | European Pat. Off. | 264/62 |
| 57-77083 | 5/1982 | Japan | 264/62 |
| 1-304915 | 12/1989 | Japan | 249/134 |

Primary Examiner—Robert Davis
Attorney, Agent, or Firm—Abelman, Frayne & Schwab

[57] ABSTRACT

A mold in accordance with the present invention can be formed by a method which utilizes a fiber reinforced pre-ceramic resin composite which is cured and fired to form a Continuous Fiber Ceramic Composite (CFCC), or alternatively by use of a pre-ceramic matrix composite, which is cured, but not fired into a ceramic state.

27 Claims, 3 Drawing Sheets

CERAMIC OR MODIFIED SILICONE FILLED MOLDING TOOLS FOR HIGH TEMPERATURE PROCESSING

BACKGROUND OF THE INVENTION

The present invention relates to the manufacture of fabric reinforced ceramic tools or molds (collectively molds) or molds made from a fabric reinforced ceramic intermediate (s) for use in high temperature organic polymer fabrication. Although the molds of the present invention may be suitable for fabrication of a wide variety of components at temperatures from ambient to 1000° C., the molds have particular applicability and suitability in the field of rotational molding (sometimes referred to herein as "rotomolding").

Molding is a well-known technique for the fabrication of parts and various molding technologies have, over the years, employed various constituents materials for the molds. To a large extent the selection of which materials can be used is determined by the nature of the molding technique and the environment to which the mold will be subjected, tempered with an evaluation of the cost of materials which have acceptable characteristics. The present invention is directed to the suitability of a category of materials often referred to as "Continuous Fiber Ceramic Composites" (CFCC) and an intermediary product in the creation of CFCC, to wit, a modified silicone filled material, both of which have been found to be highly suitable as the principal constituent for molds, particularly of a type which are likely to be subjected to relatively elevated temperatures during processing, such as in rotational molds. A series of fabrication steps, in concert with applied physical, kinetic, and mechanical properties are disclosed which are preferably employed to successfully fabricate a mold.

Rotational molding is a plastics processing technique which permits the fabrication of hollow seamless parts with relatively thin walls and excellent structural integrity. Although technically known since the early 1900's, it became more popular in the late 1950's with the advent of micronized polyethylene.

In general, in the molding process, a predetermined amount of plastic material in liquid or powder form is placed in a mold cavity and then the mold is closed. The mold is then heated to bring the plastic to a molding temperature, if the plastic is a thermoplastic, such as high density polyethylene (HDPE). As the mold is heated, it is rotated continuously both vertically and horizontally and the plastic material flows along the interior surface of the mold to form a smooth evenly distributed fused plastic shaped part. The rotation is continued through the cooling process with the plastic hardening and with the retention of the shape of the mold. The mold is then opened and the finished part removed.

Numerous materials have been used for the mold. For example, cast aluminum molds are commonly used. Cast aluminum can be relatively easily shaped to replicate intricate detail; has good thermoconductivity so that the mold can be heated and cooled relatively quickly; and the inside surfaces (which act as the molding surface) can be made very smooth through polishing, so that the outside surface of the article that is ultimately molded will, in turn, have a smooth surface. However, cast aluminum molds are relatively expensive. Moreover, aluminum being relatively soft, reinforcement or strengthening is generally required in certain locations, particularly the parting line where the mold sections meet. As well, the polishing of the inside surface is often time-consuming, expensive and requires a repolishing at relatively frequent intervals.

Sheet metal molds are also often employed for rotomolding, with the sheet metal molds fabricated from a number of metals such as steel, aluminum or stainless steel. While less expensive than cast molds, sheet metal molds do not always lend themselves well to the production of free-form shapes.

Other somewhat more exotic materials have also been employed as molds for rotomolding, such as electroformed nickel, but they are difficult to fabricate due to size limitations of the tanks necessary to plate the nickel. Some workers have even suggested using plastic molds, but such mold would be generally restricted to the use of liquid thermosetting polyester, urethane and epoxy materials which are formed and cured at room temperature, since the plastic molds do not easily withstand elevated temperatures. (Plastic molds are not commonly used, primarily due to their inability to eliminate voids.)

Ideally, molds should be made from a material which can be preformed, preferably layer-by-layer, from a material which can be built-up in layers and shaped. This would require somewhat self-adhering and malleable material so that successive layers can be integrated into a shaped body. As well, a layering process would permit the embedding of sensors within the mold, an extremely beneficial attribute given the criticality of temperature to the molding process. However, up to the present, there has been no suggestion of any material, or group of materials, which would satisfactorily provide such benefits particularly in molding where relatively high temperatures are experienced in the processing.

In recent years, continuous fiber ceramic composites (CFCC) have been developed for a number of uses, particularly in end products which are subjected to extreme heat, such as parts for rockets and space vehicles. CFCC's are composite materials which bind a continuous reinforcement fabric within a matrix, which upon firing converts to a ceramic matrix. The matrix generally consists of articles of heat resistant, generally inorganic materials combined with binders, some of which are organic and which are used to provide certain handling characteristics. A fabric is then coated with the matrix material. The fabric is generally one having high heat resistance which can withstand, (that is, not to be sacrificed or catastrophically lose its physical reinforcement properties) during the ceramic forming process. Once suitably combined the composite material is cured either at room temperature, by mixing in a "part B" catalyst before fabrication or more commonly at elevated temperatures. After curing, the composite is then fired at significantly greater elevated temperatures, causing the organic materials to be driven off, and accomplishing the necessary conversion chemistry with the resultant structure being a continuous fiber ceramic composite.

Although CFCC's are in various stages of development and prototype production, for examples as jet engine parts, heat exchangers, waste incineration components and the like, the types of CFCC's suggested for such end uses do not include the combination of physical, kinetic, viscoelastic, and mechanical properties needed to produce a successful CFCC tool for rotomolding.

Indeed, CFCC's have heretofore held little interest to those in the field of molding and in particular rotomolding, for a number of reasons. First, the fibers or fabrics used in CFCC's are exotic and high-priced and thus do not lend themselves readily to use in molds for mass produced items. Second, in driving off the organic materials during the firing stage, the space left by the removed organic materials result in micropores in the CFCC which are often undesirable for a mold, as the pores yield a less than finely smooth molding surface. If the surface of the mold does not have a sufficiently smooth finish, that surface will be imparted to the molded part and may result in an unacceptable end product, where for example a smooth, sleek surface is considered highly desirable. Given the heating and cooling stages that are present in most molding operations, and in particular rotational molding, with a porous mold air can pass from the outer surface of the mold to the inner surface of the mold with a possible resultant stippled or bubbled effect on the surface of the molded article. Moreover, present technology has not provided economical alternatives to the sacrificial organic and organic portions of inorganic/organic binders driven off by firing. Since it is these binders that are required to provide the tack, drape and lay-up capabilities to the CFCC material to permit it to be shaped in the design of the end product, and enable low temperature oxide ceramic conversion to take place, total elimination of the use of organic binders is not practical. Although a 100% yield is a goal, as long as the practical processing characteristics are not sacrificed, the realties are such that a typical matrix yield is 75→88%.

SUMMARY OF THE INVENTION

A mold in accordance with the present invention, can be formed by a method which utilizes a fiber reinforced pre-ceramic resin composite which is cured and fired to form a CFCC, or alternatively by use of a pre-ceramic matrix fabric composite which is cured, but not fired into a ceramic state.

The mold is fabricated by the successive building up of similar but preferably different layers of the composite on a plug or form. The multi-ply composite comprises a combination of different formulae of pre-ceramic polymeric resins and binders coated over a heat resistant, reinforcing fabric substrate. The initial surface coat may or may not be a CFCC, but even if it is not a CFCC, the unreinforced surface will be a similar composition probably containing reinforcing whiskers and will be applied by spraying, rolling, painting, or equivalent application means.

The multi-layered or multi-ply, continuous fiber pre-ceramic composite, which is applied to and formed on the surface of the surface coated plug, is then cured, such as by heating, with 1 atmosphere or greater pressure, at an elevated temperature for a period of time sufficient to effect a cure resulting in a thermoset mold. Alternatively, curing can be effected at lesser temperatures, or even ambient temperature, through selection of certain catalysts and or curing mechanisms.

In one embodiment and method of the present invention, the cured thermoset mold, is then fired at an elevated temperature for a period of time sufficient to form a strong, reinforced ceramic mold. In another embodiment of the present invention there is no firing and the mold is used in its pre-ceramic state. This is accomplished by selecting the organic binders from a group which have low enough degradation rates to be a cost effective alternative to a fired pre-form. Elimination of ceramic conversion, together with microporosity, has several advantages which include higher mechanical strength (ambient to approximately 200° C.) and could result in lower temperature resistant sensors being embedded.

In either embodiment the finished mold is a shaped body comprised of a combination of inorganic and organic materials generally used in the formation of a ceramic which forms a preceramic liquid matrix and a reinforcing fabric substrate within said matrix whose structural integrity and reinforcing capability are adequate with or without firing.

While the mold of the present invention may find application in various molding techniques, such as blow molding, extrusion molding, injection molding, cast molding, etc., it finds particular application, because of its unique properties, in rotational molding.

As set forth below, the present invention having recognized the potential benefits of composites of the type described, teaches as well, the unique combination of the pre-ceramic constituents, and selected organic binders sometimes collectively referred to as a matrix together with the class of fabrics selected for impregnation by the matrix to optimize mold characteristics.

The pre-ceramic constituents may be any pre-ceramic material which may be formed into a continuous solid phase at ambient (A/B components) or at elevated temperatures. The choice of the precursor is dictated by its processing abilities in conjunction with the selected fibrous substrate material and the associated cost. The liquid ceramic precursor or matrix when combined with the fabric should possess good drape, i.e., malleability, good tack, i.,e., the ability in the uncured state to build up successive layers of itself, good flow characteristics, i.e., proper viscosity, and good pre-formability. The conversion of silicone to silica hybridized with other oxides is the currently preferred type of ceramic.

Other pre-ceramic precursors, could also be adopted to successful rotomold manufacturing with similar formulation scenarios depending upon availability and cost. Examples are polycarbosilane precursor to silicon carbide, silicon oxycarbide precursors to silicon-oxycarbide, polysilizane precursors to form silicon nitride, which form Si—C, SiO—C, and Si—N, backbones, respectively. Polysilsesquioxanes also convert to Si—O. Although these pre-ceramic to ceramic precursors are not presently of practical use for large level manufacturing due to their high cost, they may be utilized in the pre-made powdered form as one or more of the sub-micron or small micron fillers, [with or without] in conjunction with or not in conjunction with other oxides.

The preceramic matrix resins usually contain ceramic oxide fillers of submicron or micron size, and need to be dispersed in a ceramic ball mill, or an equivalent, to achieve such size. Particularly suitable ceramic oxide fillers are between about 0.4 microns and 5.0 microns, with a range of from about 0.8 to about 1.2 microns being especially preferred. The size not only permits an ability to readily mix and blend the fillers with the binder resins, it assures a good penetration/immersion of the fabric by the filled matrix material. During firing, or conversion, these fillers are no longer present, which results in a continuous amorphous oxide matrix. Additives may be added to help prevent settling or reagglomeration during storage.

During the curing and [if applicable], firing to convert the liquid pre-ceramic precursor resin first into a thermoset and then into a ceramic, such as a ceramic oxide, some partially organic and organic sacrificial binders will not be sacrificed during formation of the pre-ceramic. However, in the firing stage (in air) all organic materials will volatilize and, as such, will be sacrificed. In accordance with the present invention the preferable amount of such organic volatilization does not exceed 15% by weight of the pre-ceramic composite matrix, or 8% of the ceramic composition, by weight, including reinforcement.

The binders, which usually are a combination of partially volatile (ceramic yielding-organics) and totally volatile organics (sacrificial) are particularly useful in the fabrication steps. For tool manufacturing, the combination of aggressive viscoelastic type tack, and other applied lay-up and cure characteristic need to be carefully balanced throughout the different layered requirements. The binders include a high yielding, common solvent compatible, and modifier compatible such as a phenyl/methyl substituted silicon oxide backbone, with silanol (Si—OH) or silicon hydide (S—H) termination with or without other pendent functional groups such as vinyls. The sacrificial binders, if needed, include any organic that will burn cleanly in an oxidizing environment which includes most organic substances, either thermoplastic or thermoset. Aliphatic thermoplastics or low cross link density thermosets are preferred due to low residual carbon char. Exemplary thereof are monomer and polymer acrylics, vinyl ethers, silanes (partially oxide yielding) polyesters and aliphatic urethanes. A partial listing of aromatics, which is exemplary only, includes epoxys, vinyl esters and aromatic urethanes. Aromatic modifiers are acceptable if they result in the required tack, drape and pre-form properties and can burn with little or no carbon char during firing.

Some heterocyclics could also be used, such as bismaleimids or cyanate esters but their cost, higher viscosity and poor compatibilities make them less attractive as a sacrificial matrix, but do make them attractive as a non-sacrificial matrix, if the mold service temperature and environment dictated that the non fired-non ceramic conversion route was more cost effective.

The reinforcing fabric preferably comprises continuous fibers forming a unitary fabric substrate. In the past only exotic and expensive fibers have been found suitable for CFCC usage. In accordance with the present invention which is made possible by the low temperature ceramic conversion of 600°→650° C., however, the fabric may include any of a wide variety of significantly less expensive materials. One preferred fiber from the standpoint of strength, compatibility with the ceramic precursor matrix and cost is fiberglass, particularly those which are relatively resistant to the higher service temperatures which are needed or required, for example in rotational molding service, i.e., quartz (99.5% $SiO_2$), fiberglass S and S-2. These fibers are in ready supply, generally inexpensive, are malleable and drapable. The ability of the pre-ceramic matrix to convert to an oxide matrix at a low firing temperature, as low as 600° C., is a necessary part of invention, which allows cheaper reinforcements, such as S glass, to be used, and although subject to some physical deterioration when fired, the fibers generally retain their necessary properties as a strengthening reinforcement within the CFCC even after firing sufficient for structural integrity of the mold in, for example, a rotomolding environment. The fabric may be in the form of woven, knit or non-woven fibers, 3-D fibers and may vary in terms of surface finish, weight and, if woven or knit, the type of weave or pattern, such as a hybid weave or a unidirectional pre-preg. That type of weave and drapability are highly desirable in reproducing the mold from the pattern.

Various methods of application of the matrix to the fabric will be readily apparent to those skilled in the art. For example the matrix may be applied to the fabric in various wet lay-up methods such as sponging, brushing, spraying, or painting. The objective is to have the matrix impregnate and fully fill all the interstices and fiber bundles and cover the entire surface of the fabric within a specified volume friction range of fiber and matrix.

The matrix and fabric then used to build the molds by applying them to the presurface coated plug or form. Although all of the layers may be built-up of a like pre-form composite, discrete layers can be specially selected, with, different fabric constituents or matrix constituents in differing layers. For example, instead of, or in addition to, using a continuous fabric reinforcement in the first or innermost layer of the pre-form, a non-continuous, fibrous reinforcement may also be provided in that innermost layer, such as a mat or nonwoven calendared reinforcement. The initial seal coat or surface gel coat, which is often sprayed, can employ whiskers of micron size reinforcements with an aspect ratio of greater than 5:1. Such whiskers when added to the resin matrix of the pre-form help to prevent the cracking or fissuring of the ceramic surface coat during firing or thereafter.

The layer or layers closest to the surface coated plug may include a finer and more malleable (and therefore generally more expensive) fabric within the composite to facilitate close contouring to the plug. The plug, which is usually the male form of the object to be molded, for example, a boat hull, boat deck, septic tank or water tank, may be made of any suitable material such as wood, epoxy, high density plastic foam, or polyester resin. Successive composite layers may incorporate less expensive or coarser fabrics and a lesser percentage of organic binders as the shaping of these layers is less severe. To facilitate mold creation, a number of composites can be preformed as "pre-pregs" and stabilized.

DESCRIPTION OF THE DRAWINGS

The invention will be more readily understood from a reading of the following specification and by reference to the following drawings forming a part thereof, and wherein.

Figure 1:
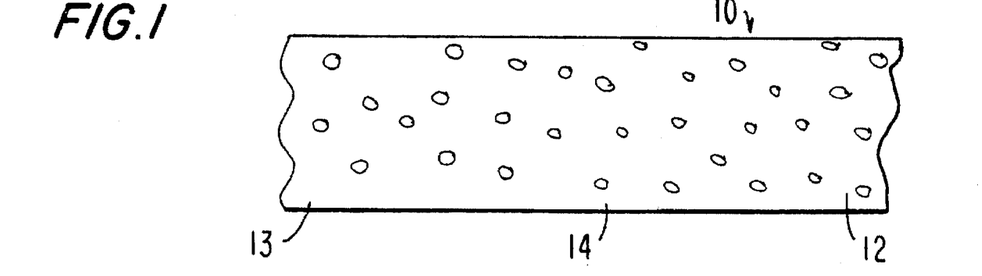
FIG. 1 is a plan view of a layer or ply of a continuous fiber, pre-ceramic in accordance with the present invention.

Referring now to the figures where like numbers connote like parts, in FIG. 1, a composite layer 10 is illustrated having a pre-ceramic matrix 12 which impregnates a continuous fiber fabric 14. The fiber fabric 14 is a finely textured, smooth grade of, for example, fiberglass S. Layer 10 is preferably the innermost layer applied to the surface of the plug during the layered build-up of the pre-form. Since the inner layer 10 will eventually become the outermost layer of the ceramic mold, it is desirable that the mold surface which is in contact with the material to be rotationally molded, e.g., polyethylene, be as smooth as possible to avoid imparting a roughened or stippled surface to the vessel's hull. Accordingly, a very finely textured smooth grade of fiberglass S is desirable. In addition, fiber whiskers 13 are preferably added to deter fissure formation.

Figure 2:
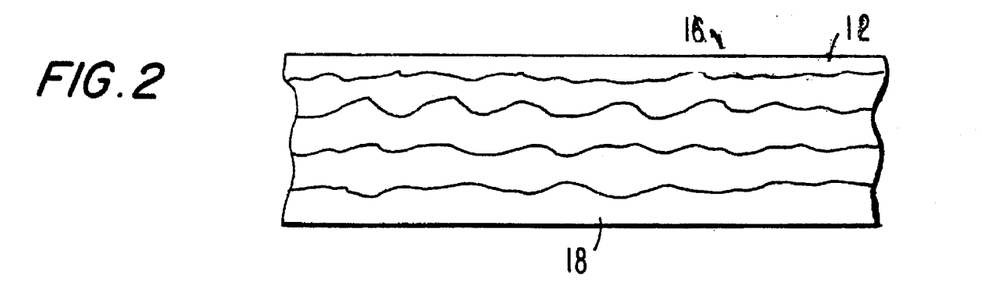
FIG. 2 is plan view of an alternative layer of a continuous fiber, pre-ceramic in accordance with the present invention.

FIG. 2, illustrates another composite layer 16 comprised of a pre-ceramic matrix 12, of the same general constituents as the pre-ceramic used in layer 10, which has been impregnated into a different continuous fiber fabric 18. The fibrous layer 18, in this instance, comprises a fabric whose texture and fineness is not as fine and smooth as the fiber 14. Since layer 16 will be an intermediate layer or ply of the ultimate mold and will not contact directly the surface of the article to be molded its outer surface characteristics are less critical. Moreover, since the degree of curvature which is required in successive layers may well be less severe, a fabric with good, but lesser drape characteristics to that of FIG. 1 may be employed.

Figure 3:
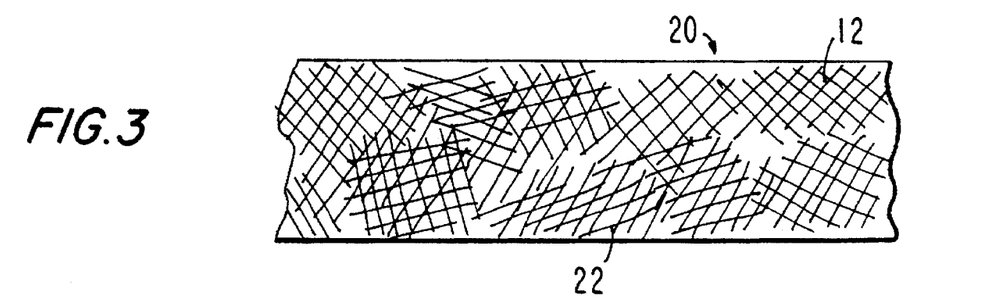
FIG. 3 is still another plan view of another layer of a continuous fiber, pre-ceramic in accordance with the present invention.

Referring to FIG. 3, the next succeeding layer to that superimposed upon layer 16, is a layer 20, which may comprise the same pre-ceramic matrix 12 as shown in FIGS. 1 and 2, but which matrix impregnates a yet again slightly coarser, continuous fiber 22. Since layer 20 is two layers removed from the object to be molded, a less costly, coarser fiber can be employed to good advantage. Although the matrix in FIGS. 1, 2 and 3 may be the same, variations in the matrix formulation may also be made, in particular to reduce the percentage of certain organic binders, as the characteristics imparted by the binders (e.g. drape) become less critical in outer layers than in inner layers.

Figure 4:
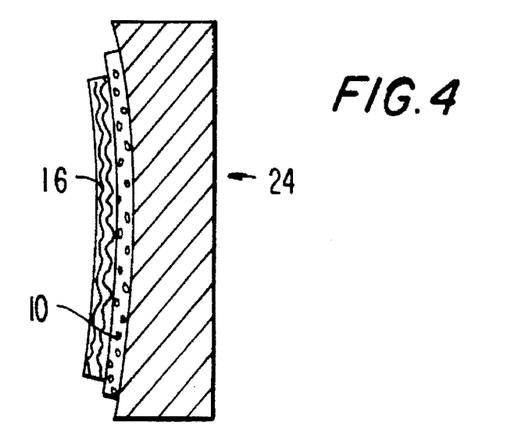
FIG. 4 is a sectional view of a plug having layers as shown in FIGS. 1 and 2, of a continuous fiber, pre-ceramic built thereon in accordance with an aspect of the present invention.
Figure 5:
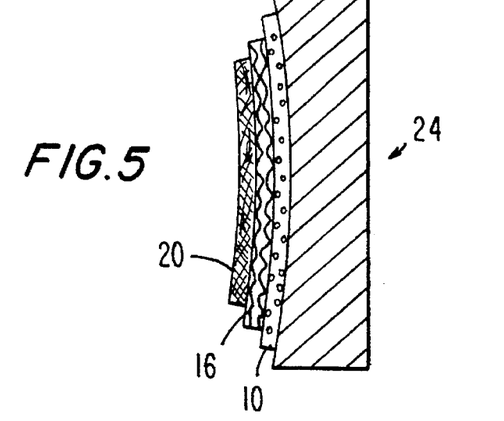
FIG. 5 is another sectional view of a plug having layers as shown in FIGS. 1, 2 and 3, of a continuous fiber, pre-ceramic built thereon in accordance with an aspect of the present invention.
Figure 6:
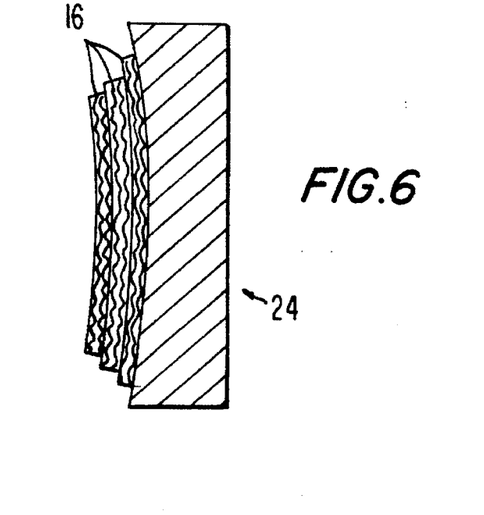
FIG. 6 is another sectional view of a plug having three (3) layers of a continuous fiber, preceramic built thereon in accordance with another aspect of the present invention.

FIG. 4 illustrates, in section, a plug 24 having coated thereon two layers, namely, 10 and 16 of FIGS. 1 and 2, respectively. FIG. 5 illustrates, in section, a plug 24, having three (3) layers, namely, 10, 16 and 20 of FIGS. 1, 2 and 3, respectively, thereon. FIG. 6 depicts, in section, the plug 24, having three layers of layer 16 coated thereon. Layer 16, which comprises pre-ceramic matrix 12 and reinforcing fabric 18 whose texture and fineness is of good quality, but need not be as fine and as smooth as fiber 14. All of the layers or plies comprising the pre-form from the innermost layer to the outermost layer, and all intermediate layers can include layer 16 containing fabric 18.

The number of plies or layers employed depends upon the mold specifications, but it has been found that a range from 5 to 25, (with 7 plies being preferred,) with the thickness of each ply being from about 5 mils to about 30 mils, (with about 20 mils being the preferred ply thickness) is particularly suitable for rotomolding application.

When glass fibers are used, such as, for example, fiberglass, certain characteristic properties are imparted which ultimately benefit the physical properties of the ceramic mold or thermoset which is formed. Woven glass fabrics which possess both physical integrity and which are uni-directional in nature, are preferred in particular fiberglass S, which is in he form of a woven mat of fibers, which imparts its physical properties to the finished mold. To the extent possible it is desirable that the physical properties of the fibers be congruent with the physical properties of the liquid pre-ceramic matrix to assure that the ultimate CFCC or cured pre-ceramic composite will have the advantageous properties that are present initially in the multi-layered pre-forming process. For example, the coefficient of thermal expansion (CTE) of the fibers and the pre-ceramic, during the curing and (if employed) firing steps, should substantially coincide to avoid the development of microcracks and interface de-bonding.

Given the need for the fabrics to have good drape characteristics so as to enable the fabric to contour over complex patterns to provide good pattern replication, a soft weave is desirable. This is especially true when working with complex shapes, such as curvilinear and complex geometric shapes. Thus, the preferred weave of the fabric is one which results in a soft fiber interlocking which can readily adapt to plug contours having compound curves with tight radii. Further, the fabric in conjunction with the liquid pre-ceramic must have the ability in successive layers or plies of holding or maintaining their own weight on a vertical surface. Still another consideration is that the fibers comprising the fabric must have adequate interstitial spacing to allow the pre-ceramic liquid precursor, which forms the matrix, to penetrate into the fabric.

An overriding consideration, particularly if a firing is to take place, is to provide a fabric whose fibers will not catastrophically degrade during firing. As heretofore described, it has been found that S glass or S-2 glass can be suitably woven and is particularly suitable for rotomolding usage.

Figure 7:
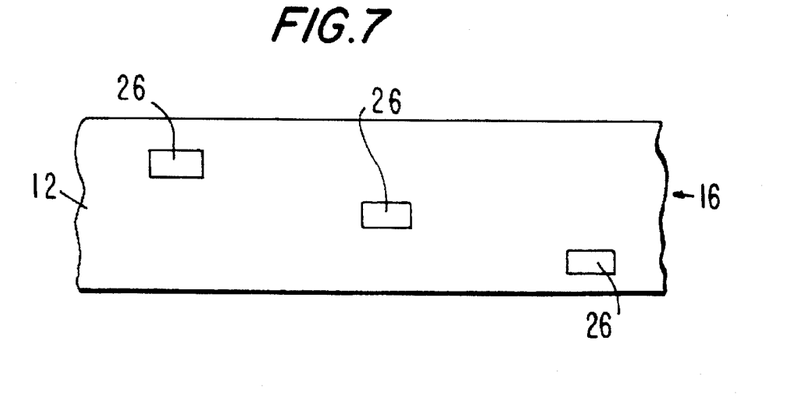
FIG. 7 is a plan view of a layer of a continuous fiber pre-ceramic in accordance with the present invention having a heat sensor embedded therein.
Figure 8:
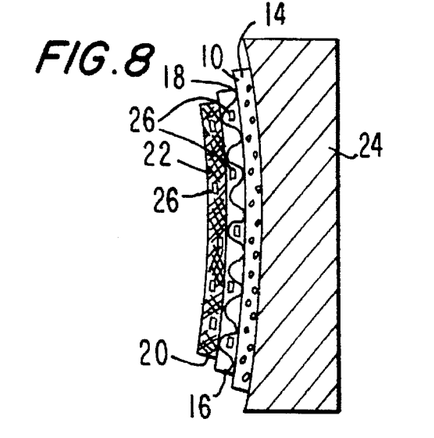
FIG. 8 is a sectional view of a plug with heat sensors embedded in certain of the pre-form layers.

The method of mold formation is uniquely suitable for the embedding therein of various sensing devices. For example, during this layering build-up, prior to curing, sensors, such as heat sensors can be embedded in or between one or more of the layers which when linked to monitors or other devices will provide a control means or monitoring mechanism in the completed mold for determining and/or controlling, for example the proper dwell times during the rotational molding process. As illustrated schematically in FIG. 7, a plurality of heat sensors 26 are embedded in the pre-ceramic matrix 12 of layer 16. In FIG. 8, the heat sensors 26 are illustrated as being embedded between layers 16 and 22. As a consequence the finished mold will have embedded therein a mechanism to provide information, on any number of critical molding parameters such as rotational time, or cool-down time, as well as the productivity of the oven. The embedded sensors need to hold up to 600° C. firing, or fused onto mold with a heat resistant organic or silicone and periodically replaced. The sensors can be embedded directly into an unfired pre-form, if the pre-form will hold up to the environment.

Figure 9:
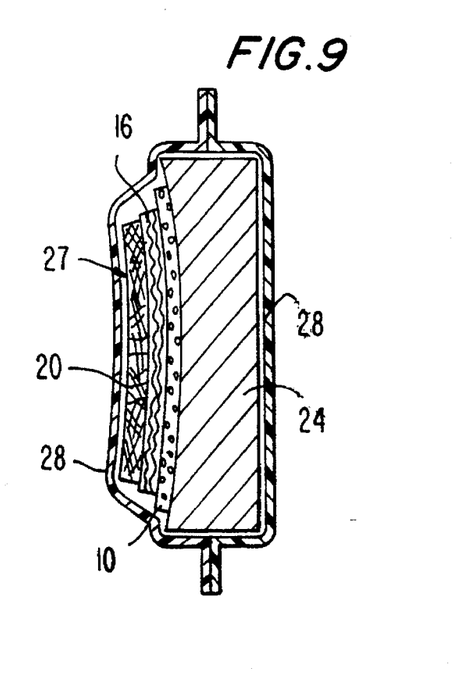
FIG. 9 illustrates vacuum bagging of the layers on the plug in accordance with the present invention.

After the desired number of layers of liquid pre-ceramic and fabric substrate have been built up whether with or without sensors, the plug containing the multiple layers is preferably compacted, such as, for example, by the use of vacuum-bagging as schematically illustrated in FIG. 9 wherein the multi-layer composite 27 formed on the plug 24 is subjected to the vacuum bag means 28 to compact the same.

The compacted composite 27 is then cured at a pressure of from about 10 psig to about 100 psig, with approximately 15 psig being preferred, at a temperature of from about ambient to about 350° F., with a temperature of from about 180° F. to about 350° F. being preferred, for a period from of about 15 minutes to about 24 hours needed to effect a cure. At ambient temperature a cure might be effected in about 24 hours, while at 350° F. a cure might be effected in about 15 minutes. Other means of curing may also be used.

For example, a cure in the absence of elevated temperature can be accomplished by using silicone epoxys and or silicone urethanes in an A/B matrix. The epoxy and/or urethane becomes sacrificial with a resulting oxide ceramic matrix similar in properties and composition of matter to a one component heat cure pre-form formulation. Little or no carbon char is retained.

As an alternative to the use of mechanisms which will cure at ambient temperatures, the use of one-component heat cure mechanisms, such as peroxide catalyzed, free-radical initiated unsaturated monomers/oligomers is preferred. It is preferred to employ as the organic peroxide catalyst either dicumyl peroxide, benzoyl peroxide, di-tertiary butyl peroxide or methyl ethyl ketone peroxide.

Once cured the mold form is removed from the plug. After removal the mold, which for example is in the shape of a boat hull can be used. Alternatively it can be further processed and the cured mold converted into a ceramic mold, by firing. The firing is conducted at elevated temperatures which are gradually advanced, or "ramped-up", starting from about 200° F. and advancing to about 1100° F. over a period of from about 250 minutes to about 2000 minutes and at a rate of advance from about 0.5° F./min., to about 5° F./min. To avoid significant degradation of the reinforcing fibers the lowest possible temperatures are employed since if the temperature is too high, or if the temperature is advanced too rapidly during the firing, the reinforcing fibers, for example, fiberglass S, tend to lose their tensile strength. As well by controlling the firing, the organics, are being driven off slowly without igniting and without delaminating the panel with a fast rate of volatile release.

If the cured but unfired mold is used to mold finished products the organic binders remain, thus eliminating the formation of micropores. The mold as cured is dense, low porosity and free of defects. As well, in the absence of firing, there is no physical damage to the fibers of the fabric. In such non-fired molds, the organic binders are preferably selected from a group which have low rates of oxidative thermal degradation since the rotomolding temperature generally employed in rotomolding plastics is generally in the range of 500° F. to 600° F. If the mold is other than a rotomold, the organics are selected from a group again having a low thermal degradation rate, predominately polyaromatics and heterocyclics and which are compatible with polysiloxanes with pendent pheryl and methyl groups.

In cases where the mold is a ceramic, i.e., fired with the organics driven off, the presence of micropores does not prevent the mold from usage for molding articles which do not require a smooth surface such as septic tanks. However, if a smooth surface is desired, the same can be readily provided in a number of ways, such as by surface sealing and/or redensification of the mold.

Figure 10:
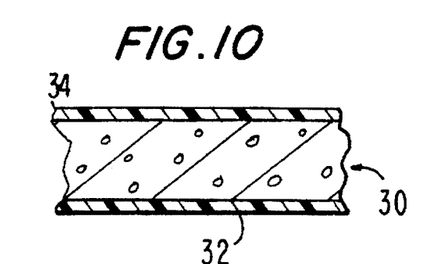
FIG. 10 is a sectional view illustrating a mold in accordance with the present invention having a sealing coat on the inner and outer mold surfaces.

Surface sealing is achieved either by coating the pattern, vitrifying or curing, and leaving bondable sites for the next ply lay-up pre-form curing, and having seal coat removed from the pattern, or by surface treating the fired tool, or surface treating the unfired but pre-formed tool and converting the surface coat to oxide ceramic in-situ with part. As can be seen by reference to FIG. 10, a mold 30, in accordance with the present invention, illustrated in section, has sealing coats 32 and 34 applied to its inner and outer surfaces, respectively.

The former is a preferred method in which a high yielding, non-microcracking, durable coating must result after firing. The fired tool may be coated with high temperature organics such as fluorinated aromatics and heterocyclics, (polyimids and polyarylene ethers) polybenzimidazoles, silicones—fluorinated aliphatics, such as Teflon coating, Kynar coating, etc. which will hold up for many cycles, but probably need to be replaced periodically.

A glaze, or vitreous glass (frit) can also be employed. Preferred are those which are lead-free and can be fired @650° C. and can be fired in-situ or as a secondary step. The glazes can also be utilized with reinforcing whiskers and/or vitreous forming oxides utilizing some binders as in laminating resins.

Redensification of the composite may. be accomplished one of three ways which are:

1. Impregnation with a low viscosity high yielding oxide polymer. A second firing is required to convert the organic/inorganic polymer (often referred to as "ceramer").

2. Impregnation with a high temperature oxide polymer without firing.

3. Impregnation with a high temperature polymer, either thermoplastic or thermoset, which will have a slow rate of thermal oxidative degradation. This will most likely come from the class of predominantly heterocyclis and aromatic backbones described above. Redensification of a porous mold section 36 is depicted schematically in FIG. 11.

Figure 11:
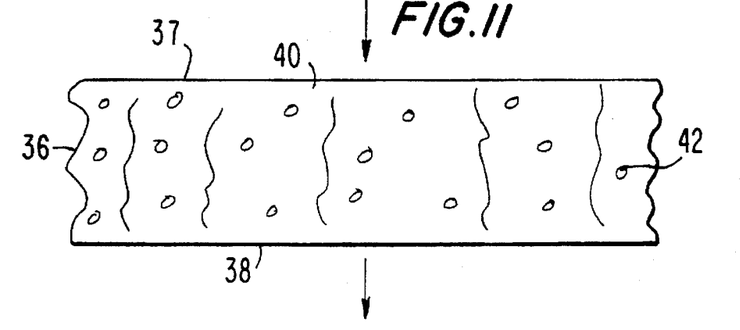
FIG. 11 is a schematic illustrating redensification of the mold surface.

A glaze or vitreous glass (frit) can also be employed. Preferred are those which are lead free and which can be fired @650° C. or lower—possible use of low aspect whiskers for reinforcing without cracking requires a high yield. One of the above type of materials are applied by soaking, painting, coating, or the like, to a surface 37 of the mold 36. A source of negative pressure is optionally applied to a mold surface 38 which causes compound 40 to be drawn into the voids 42 of mold section 36.

In a preferred embodiment of the present invention, the ceramic mold, which is a 100% ceramic oxide after the firing step, is employed in rotational molding to form, for example, the hull of a pleasure boat, of desired length. Both the nature of the object and its dimensions are merely exemplary.

Figure 12:
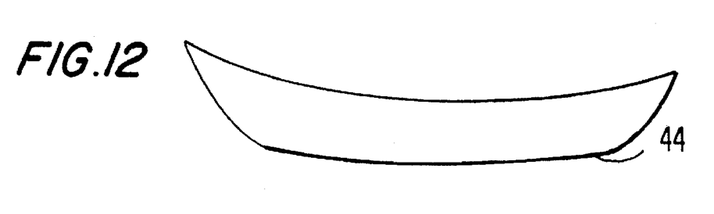
FIG. 12 is a schematic of a boat hull formed by the mold of the present invention.

As is well known in rotational molding operations, the two molds halves are joined together and filled with a metered amount of powder or liquid, which is sometimes referred to as "charging" the molds. In the molding of boat hulls made from polyethylene, the molds are filled with a polyethylene resin suitable for use in manufacture of boat hulls. The joined mold halves are secured by a frame or "spider" and placed in a heated oven, and rotated biaxially. During the heating, at 500° F. to 600° F., the resin melts, fuses, and densities into the shape of the mold. Thereafter, the molds are moved into a cooling chamber or station, where they are slowly cooled by air and water. After removal from the cooling chamber the molds are opened and the finished articles, in this instance, a plastic boat hull is released. FIG. 12 depicts a boat hull 44 as it is released from the mold.

During the rotational molding process the mold is subjected to significant changes in temperature. With metal molds these temperature changes result in thermal expansion and contraction of the molds. As a consequence special clamps and securements are required to permit expansion and contraction or mold distortion or cracking can occur. However, molds made in accordance with the present invention result in X2 to X5 lower CTEs than metal molds and therefore not only avoid the need for these relatively expensive clamping devices, as well the removal of these stresses provides molds which have a longer useful life than metal molds.

Additionally, the ceramic molds can easily be reshaped and/or resurfaced and recoated. Theoretically at least, an infinite number or articles can be molded in a mold of the present invention without stressing or cracking the mold, while a cast aluminum mold is limited to molding perhaps, one thousand articles before the mold cracks and is of no further use or utility.

In order to disclose more clearly the nature of the present invention, the following examples illustrating the invention are given. It should be understood, however, that this is done solely by way of example, and is intended neither to delineate the scope of the invention nor limit the ambit of the appended claims.

EXAMPLES

Example-1A

SURFACE COAT/SEALER

A surface coat/sealer formulation, as set forth below, is applied to a boat hull plug by means of spraying and thereafter it is cured for 1 hour at 120° C.

| Ingredient | % by Wt. |
|---|---|
| 1. Silanol Terminated Pheny Methyl Pendent Siloxane | 8.7 |
| 2. Acrylic Terminated Aliphatic Urethane | 3.5 |
| 3. Alumina (sub-micron) | 28.0 |
| 4. Titania (sub-micron) | 14.0 |
| 5. Trimethylol Propane Tri-Acrylate | 5.0 |
| 6. Alumina Whiskers | 39.0 |
| 7. Mixture of Dicumyl Peroxide, Di-Tertiarybutyl Peroxide and Methylethyl Ketone Peroxide | 0.2 |
| 8. Tri Glycidyl Ether of Para Amino Phenol | 2.0 |
| | 100.0% |

Example-1B

FIRST PLY LAY UP

Woven fiberglass S-2 is applied over the surface coat described immediately above in Example 1-A. The S-2 fiberglass must have a conforming geometry to the geometry of the plug to allow for ease of matrix impregnation.

The formulation of the first or innermost ply matrix is as follows:

| Ingredient | % by Wt. |
|---|---|
| 1. Silanol Terminated Phenyl Methyl Pendent Siloxane | 14.7 |
| 2. Alumina (Calculated) 1 Micron | 47.0 |
| 3. Titanium Dioxide | 23.0 |
| 4. Trimethylol Propane Tri-Acrylate | 7.0 |
| 5. Vinyl Ester | 7.0 |
| 6. Tertiary Butyl Peroxide | 0.2 |
| 7. Dicumyl Peroxide | 0.1 |
| | 100.0% |

The solids content is reduced to about 60% to about 80% by the addition of the isopropyl alcohol as a solvent.

Thereafter, the woven fiberglass S-2 is applied over the coated plug. Then the matrix is applied, thus insuring thorough impregnation. Upon evaporation of most of the solvent, the resultant is a high cohesive, interply tack. Thereafter, vacuum debuking at 40° C. to 70° C. takes place to remove the balance of the remaining solvent and to consolidate.

Example 1-C

LAMINATE PLIES WHICH ARE PREIMPREGNATED (PRE-PREG)

After completing the procedures described in Examples-1A and 1B above, the layers on the boat hull plug are built-up to the desired thickness with multiple pre-preg lamina.

In each of the instances described below, fiberglass S-2 is employed.

FORMULATIONS OF LAMINATE PLIES (PRE-PREGS)

Example 1-C(a)

The same formulation as is described in Example-1-A (Surface Coat/Sealer) is employed, except no alumina whiskers are used. An acetone solvent is employed for the manufacture of the pre-preg. During the manufacture of the pre-preg the acetone is evaporated. After the lamina plies are built-up to the desired thickness, a vacuum bag is applied at 1 atmosphere for 1 hr. at 120° C. to effect a cure of the pre-form.

Example 1-C(b)

The formulations of Parts A and B are set forth below for an ambient cure.

| | % by Wt. |
|---|---|
| PART A | |
| 1. Silanol Terminated Phenyl Methyl Pendent Siloxane | 15.0 |
| 2. Alumina (sub-micron) | 47.0 |
| 3. Titanium Dioxide | 23.0 |
| 4. Tri Methanol Tri-Acrylate | 15.0 |
| | 100.0% |
| PART B | |
| Triethylene Tetramine | 100.0% |

Since Parts A and B are not latent, they will react at ambient temperature.

Parts A and B are thoroughly mixed in a ratio of 100 parts of Part A and 8 parts of Part B. Acetone is added to the A–B mixture until 70% solids are obtained, after which the pre-preg is prepared. A vacuum bag is applied at 1 atmosphere and cured for 24 hours at a minimum, or a longer period of time, at ambient temperature or above.

Example 1-C(c)

The formulation employed in this example is exactly the same as that employed in Example 1-C(a), except that the first listed ingredient is not employed. Instead, a vinyl terminated phenyl methyl siloxane polymer is employed, which is manufactured by McGah Nu Sil, Lot #BA047.

The formulation was cured for 1 hour at 180° C., with a vacuum bag at one atmosphere.

The properties of the composites formed in each of the foregoing examples (except for the surface coat), have the following mechanical properties based on the use of woven fiberglass S-2. The values are based on multiple experimental values.

A. Flexural Strength @23° C.—20–30 KSI

B. Flexural Strength @300° C.—20–30 KSI

C. Interlaminar Stear @23° C.—0.8–1.0 KSI

D. Typical Porosity (by weight)—10% (non re-densified)

E. Typical Porosity (by volume)—20° C. (non re-densified)

While only certain embodiments have been disclosed, it will be apparent to those skilled in the art that various modifications can be made without departing from the spirit and scope of the present invention. All such modifications coming within the scope of the appended claims are intended to be carried out thereby.

What is claimed is:

1. A thermoset mold prepared in accordance with a method which comprises the steps of:
   (a) forming a multi-ply, preform composite comprising,
      i) a pre-ceramic polymeric resin matrix,
      ii) a heat resistant, reinforcing, fabric substrate, and
      iii) at least one binder; and
   (b) curing the multi-ply composite pre-form of step (a) at a temperature in the range of from about ambient temperature to about 350° F. on a plug to form a thermoset mold.

2. A ceramic mold prepared in accordance with a method which comprises the steps of:
   (a) forming a multi-ply, preform composite comprising,
      i) a pre-ceramic polymeric resin matrix,
      ii) heat resistant, reinforcing, fabric substrate, and
      iii) at least one binder;
   (b) curing the multi-ply composite pre-form of step (a) at a temperature in the range of from about ambient temperature to about 350° F. on a plug to form a thermoset mold; and
   (c) firing the thermoset mold of step (b) at an elevated temperature for a period of time to form a reinforced ceramic mold.

3. A mold comprising a shaped body comprised of successive layers of a combination of inorganic materials, a pre-ceramic, polymeric matrix, a binder and a reinforcing fabric substrate.

4. The mold of claim 3 wherein the mold is selected from molds for use in rotational molding, extrusion molding, blow molding, cast molding and injection molding.

5. The mold of claim 3 wherein the mold is for use in rotational molding.

6. The mold of claim 3, wherein the inorganic materials are selected from the group consisting of oxides, carbides and nitrides of silicon and aluminum, and mixtures thereof.

7. The mold of claim 3, wherein the inorganic materials are selected from the group consisting of the oxides of silicon and aluminum, and mixtures thereof.

8. The mold of claim 7 wherein the particle size of the inorganic materials is from about 0.4 to about 5.0 microns.

9. The mold of claim 8 wherein the particle size of the inorganic materials is about 0.8 to about 1.2 microns.

10. The mold of claim 3 wherein the reinforcing fabric substrate is selected from the group consisting of quartz, fiberglass S and fiberglass S-2, and mixtures thereof.

11. The mold of claim 3 wherein the reinforcing fabric substrate is fiberglass S.

12. The mold of claim 6 wherein the reinforcing fabric substrate is selected from the group consisting of a woven fabric, a knit, a non-woven fabric, a needle punched non-woven fabric, a fabric having 3-D fibers, a hybrid weave and a uni-directional pre-preg.

13. The mold of claim 12 wherein the reinforcing fabric substrate is a woven fabric.

14. The mold of claim 12 wherein the surface of said mold is coated with a compound selected from the group consisting of tetrapolyfluoroethylene, polyheterocycles and aromatics.

15. A mold fired into a ceramic comprising: a shaped body comprised of successive layers of a combination of inorganic materials, a pre-ceramic polymeric matrix, a binder and a fabric reinforcing substrate.

16. A mold comprising a shaped body comprised of multiple layers, each of said layers including,
   i) a pre-ceramic polymeric resin;
   ii) at least one binder, said resin and binder forming a matrix; and
   iii) a heat resistant, reinforcing fabric substrate impregnated with said matrix.

17. A mold comprising a shaped body of multiple layers, each of said layers including,
   i) a pre-ceramic polymer resin,
   ii) at least one binder, said resin and binder forming a matrix, and
   iii) a heat resistant, reinforcing fabric substrate impregnated with said matrix.
   wherein at least two of said multiple layers include a different binder.

18. The mold of claim 3 wherein a smooth and finely textured fabric substrate is employed in a first mold layer.

19. A mold comprising a shaped body comprised of successive layers of a combination of inorganic materials, a pre-ceramic polymeric matrix, a binder and a reinforcing fabric substrate wherein said first mold layer includes inorganic whisker materials to deter fissure formation on the surface of the mold and a smooth and finely textured fabric substrate.

20. The mold of claim 18 wherein a fabric substrate is employed in the mold layer adjacent the first layer is coarser than the fabric substrate in the first mold layer.

21. The mold of claim 20 wherein at least one of the remaining mold layers employ a fabric substrate of a coarser composition than that employed in the first and second mold layers.

22. The mold of claim 3 wherein the matrix in at least two layers are the same or different from each other.

23. The mold of claim 3 which is cured at a temperature of from about ambient to about 350° F. to form a thermoset mold.

24. A ceramic mold comprising a shaped body comprised of successive layers of a combination of inorganic materials, a pre-ceramic polymeric matrix, a binder and a reinforcing fabric substrate within said inorganic materials which is first cured at a temperature of from about ambient temperature to about 350° F. to form a thermoset mold and which is fired after curing at a temperature between about 200° F. and about 1100° F. to form a ceramic mold.

25. The mold of claim 5 wherein the mold is a rotational mold in the shape of a boat hull.

26. The mold of claim 3 wherein the mold is a thermoset rotational mold.

27. The mold of claim 7 wherein the mold is a ceramic rotational mold.

* * * * *